US011275145B2

(12) United States Patent
Aoki

(10) Patent No.: US 11,275,145 B2
(45) Date of Patent: Mar. 15, 2022

(54) ANTENNA DEVICE AND TARGET DETECTING DEVICE

(71) Applicant: DENSO CORPORATION, Kariya (JP)

(72) Inventor: Kazuhiro Aoki, Kariya (JP)

(73) Assignee: DENSO CORPORATION, Kariya (JP)

(*) Notice: Subject to any disclaimer, the term of this patent is extended or adjusted under 35 U.S.C. 154(b) by 344 days.

(21) Appl. No.: 15/766,168

(22) PCT Filed: Oct. 5, 2016

(86) PCT No.: PCT/JP2016/079609
§ 371 (c)(1),
(2) Date: Apr. 5, 2018

(87) PCT Pub. No.: WO2017/061462
PCT Pub. Date: Apr. 13, 2017

(65) Prior Publication Data
US 2018/0284216 A1 Oct. 4, 2018

(30) Foreign Application Priority Data
Oct. 7, 2015 (JP) .............................. JP2015-199654

(51) Int. Cl.
*G01S 1/00* (2006.01)
*G01S 3/46* (2006.01)
*H01Q 21/06* (2006.01)
*H01Q 1/32* (2006.01)
*G01S 13/931* (2020.01)
*H01Q 13/20* (2006.01)
*H01Q 21/08* (2006.01)
*G01S 7/03* (2006.01)
(Continued)

(52) U.S. Cl.
CPC ............... *G01S 3/46* (2013.01); *H01Q 21/06* (2013.01); *G01S 7/02* (2013.01); *G01S 7/03* (2013.01); *G01S 13/93* (2013.01); *G01S 13/931* (2013.01); *H01Q 1/3233* (2013.01); *H01Q 13/08* (2013.01); *H01Q 13/206* (2013.01); *H01Q 21/0006* (2013.01); *H01Q 21/08* (2013.01)

(58) Field of Classification Search
CPC ..... G01S 3/46; G01S 7/02; G01S 7/03; G01S 7/42; G01S 13/93; H01Q 13/08; H01Q 13/206; H01Q 21/0006; H01Q 21/06; H01Q 21/08; H01Q 1/3233; H01Q 25/00
USPC .................. 342/385, 423, 432, 434, 437
See application file for complete search history.

(56) References Cited

U.S. PATENT DOCUMENTS 6,317,095 B1 * 11/2001 Teshirogi ................. H01Q 3/24
343/770
6,496,158 B1 * 12/2002 Ksienski ................... H01Q 3/36
342/374
(Continued)

FOREIGN PATENT DOCUMENTS

| CN | 103907242 | 7/2014 |
|---|---|---|
| JP | 4715871 B2 | 7/2011 |
| JP | 2013-504764 A | 2/2013 |

*Primary Examiner* — Chuong P Nguyen
(74) *Attorney, Agent, or Firm* — Maschoff Brennan

(57) ABSTRACT

An antenna device for receiving radio wave signals includes antenna groups. Each of the antenna groups includes unit antennas arranged in a predetermined direction. The antenna groups are arranged in the predetermined direction at equal intervals. The unit antennas in each of the antenna groups are arranged at two or more different intervals in the predetermined direction in the antenna device.

12 Claims, 5 Drawing Sheets

(51) Int. Cl.
  *G01S 7/02* (2006.01)
  *G01S 13/93* (2020.01)
  *H01Q 13/08* (2006.01)
  *H01Q 21/00* (2006.01)

(56) References Cited

U.S. PATENT DOCUMENTS

| | | | |
|---|---|---|---|
| 6,850,190 B2* | 2/2005 | Ryu | H01Q 1/246 329/317 |
| 7,069,050 B2* | 6/2006 | Yoshida | H01Q 1/246 370/334 |
| 7,525,479 B2* | 4/2009 | Nagai | G01S 13/34 342/118 |
| 7,924,214 B2* | 4/2011 | Ando | H01Q 21/0037 342/70 |
| 8,624,775 B2* | 1/2014 | Inami | H01Q 21/061 342/107 |
| 8,779,995 B2* | 7/2014 | Kirino | H01Q 1/3291 343/713 |
| 9,190,739 B2* | 11/2015 | Shi | H01Q 21/0037 |
| 9,258,049 B2* | 2/2016 | Fujii | H04B 7/0848 |
| 9,912,074 B2* | 3/2018 | Ray | H01Q 21/08 |
| 10,141,657 B2* | 11/2018 | Kishigami | G01S 13/4463 |
| 10,218,086 B2* | 2/2019 | Minami | H01Q 21/29 |
| 2004/0009755 A1* | 1/2004 | Yoshida | H01Q 1/246 455/101 |
| 2009/0303105 A1 | 12/2009 | Ando | |
| 2010/0045507 A1 | 2/2010 | Yamano et al. | |
| 2011/0187614 A1* | 8/2011 | Kirino | H01Q 1/3291 343/713 |
| 2012/0050091 A1* | 3/2012 | Inami | H01Q 21/061 342/107 |
| 2012/0223852 A1 | 9/2012 | Gross et al. | |
| 2012/0256784 A1* | 10/2012 | Nakabayashi | H01Q 21/065 342/147 |
| 2014/0285373 A1* | 9/2014 | Kuwahara | G01S 13/931 342/27 |
| 2016/0172767 A1* | 6/2016 | Ray | G01S 3/46 343/893 |
| 2018/0358694 A1* | 12/2018 | Shimizu | H01Q 3/2605 |
| 2020/0044361 A1* | 2/2020 | Kishigami | G01S 13/42 |
| 2021/0005983 A1* | 1/2021 | Yamaguchi | H01Q 21/24 |

* cited by examiner

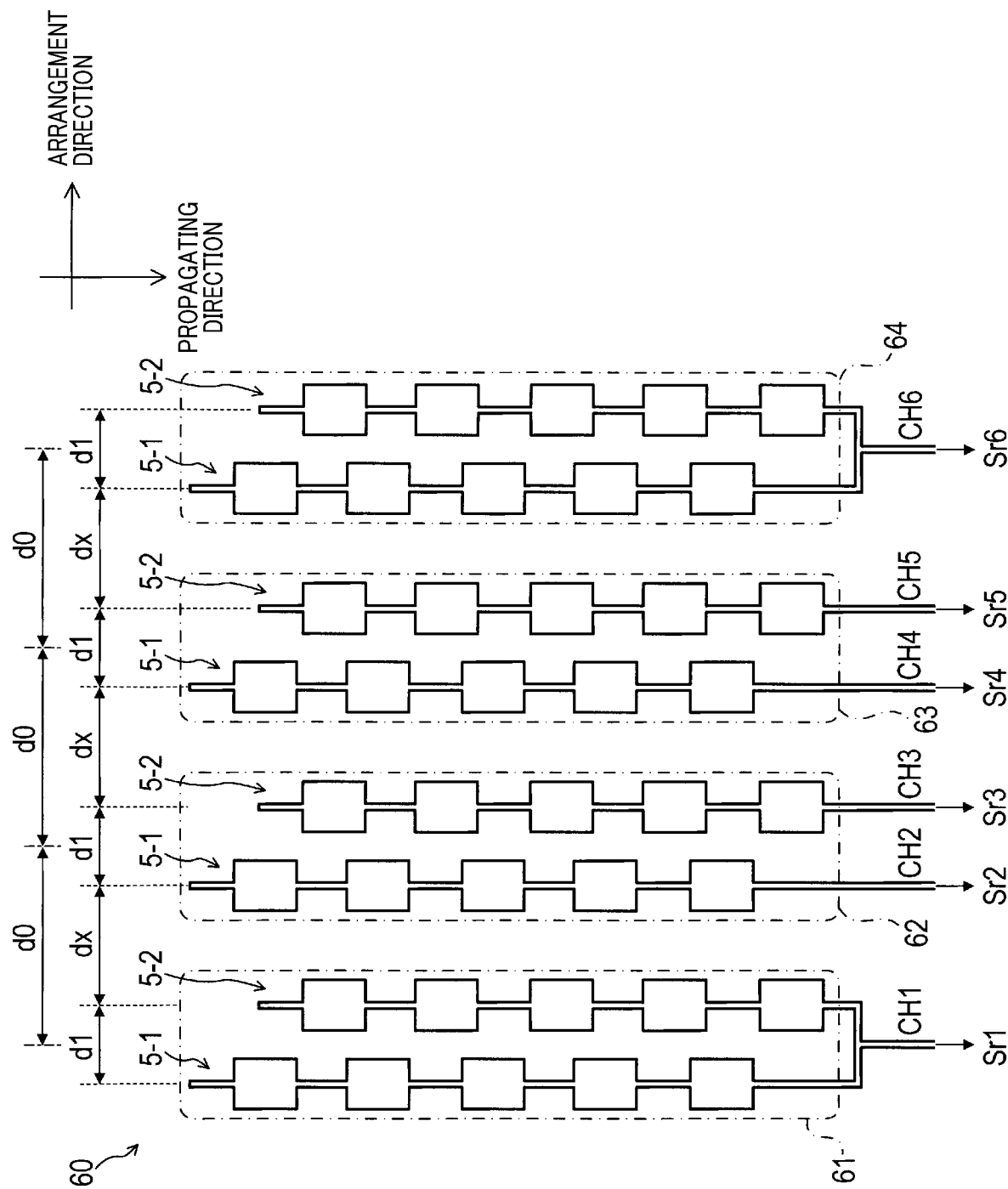

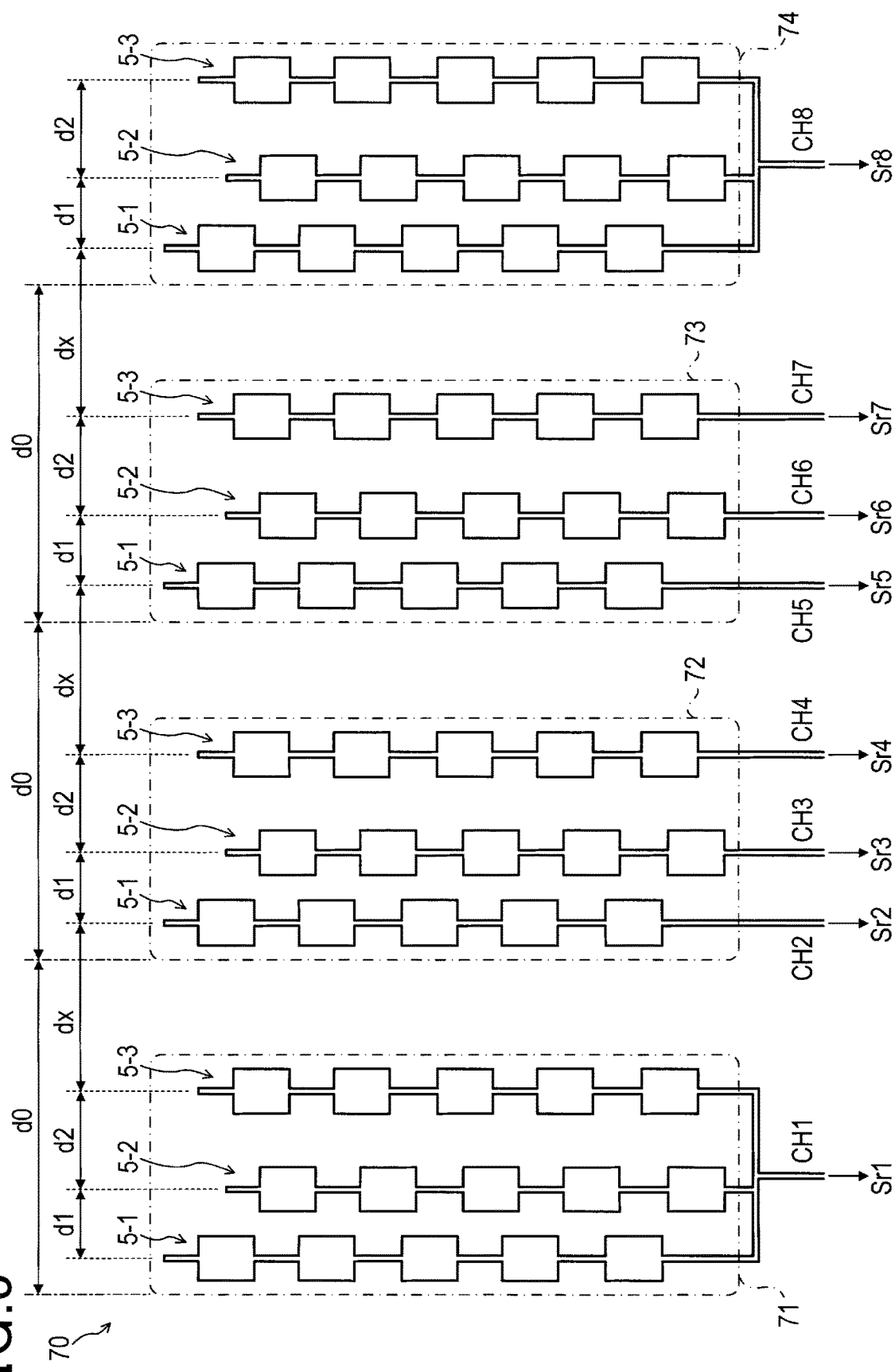

ANTENNA DEVICE AND TARGET DETECTING DEVICE

TECHNICAL FIELD

The present disclosure relates to a target detecting device for detecting the azimuth of a target and to an antenna device used in the target detecting device.

BACKGROUND ART

There are proposed various techniques of transmitting a radar wave signal, receiving, by a plurality of receiving antennas, waves that are based on reflection of the transmitted radar wave signal from a target, and detecting the azimuth of the target based on received signals obtained by the respective receiving antennas.

Patent Literature 1 (PTL 1) discloses an azimuth detecting device that detects a target in a wider angular range in a horizontal direction without increasing an area of each receiving antenna element.

Specifically, in the azimuth detecting device disclosed in PTL 1, a plurality of antenna elements is arranged at first intervals d1. The azimuth detecting device performs a first signal processing task based on a received signal from each of the antenna elements in a short-distance area detection mode, and performs a second signal processing task based on a received signal from each of the antenna elements in a long-distance area detection mode; the first and second signal processing tasks are different from each other.

CITATION LIST

Patent Literature

[PTL 1]
Japanese Patent Publication NO. 4715871B

SUMMARY OF THE INVENTION

Technical Problem

In order to make it possible to detect, in a wider angular range, the azimuth of a target existing in a short distance, it is sufficient to narrow the arrangement intervals between the receiving antennas.

However, simply narrowing the arrangement intervals between the receiving antennas while fixing and maintaining the number of channels in the azimuth detecting device lowers angle accuracy and angle resolution (hereinafter, collectively referred to also as angle performance).

In contrast, let us consider an azimuth detecting device in which the arrangement intervals between the receiving antennas is widened in view of the angle performance. In the azimuth detecting device, a so-called grating ghost due to phase reflection in a wide-angle region may increase the possibility of erroneously detecting a target, that is, erroneously detecting existence of a target in an azimuth in which no real targets exist.

The present disclosure has been made in view of the above problems and aims to provide an antenna device capable of preventing erroneous detection of a target due to a grating ghost while maintaining excellent angle performance, and a target detecting device using the antenna device.

Solution to Problem

An antenna device according to a first aspect of the present disclosure is an antenna device for receiving a radio wave signal. The antenna device includes a plurality of antenna groups, each of the antenna groups (41 to 44, 51 to 53, 61 to 64, 71 to 74) including a plurality of unit antennas (5-1, 5-2, 5-3) arranged in a predetermined direction. The plurality of antenna groups are arranged in the predetermined direction at equal intervals. The plurality of unit antennas in each of the plurality of antenna groups are arranged at two or more different intervals in the predetermined direction in the antenna device.

The above configured antenna device includes the plurality of antenna groups arranged at equal intervals. This enables the antenna device according to the first aspect of the present disclosure to be applied as a receiving antenna of a device configured to receive a reflected wave of a search wave to thereby detect a target. Specifically, it is possible to detect, based on the received signal for each of the plurality of antenna groups, an azimuth of a target existing at a relatively long distance in a predetermined azimuth angle range.

In addition, all of the plurality of unit antennas of the antenna device according to the first aspect of the present disclosure are not arranged at equal intervals as the entire antenna device, and are arranged at the two or more different intervals.

Using the antenna device makes it possible to obtain, for a target in a distance at least closer than the long distance, an azimuth detection result in a wider angle range than the azimuth angle range in accordance with the individual received signals from the respective unit antennas while maintaining an angle performance; the azimuth detection result includes reduced erroneously detected targets due to grating ghosts.

A target detecting device according to a second aspect of the present disclosure includes a transmitting portion (2, 3) configured to transmit a search wave, a receiving portion (4, 50, 60, 70) configured to receive a reflected wave signal that is generated based on reflection of the search wave by a target, and an azimuth detecting section (6, 8, 10) configured to detect an azimuth of the target based on the reflected wave signal received by the receiving portion.

The receiving portion includes a plurality of antenna groups. Each of the antenna groups (41 to 44, 51 to 53, 61 to 64, 71 to 74) includes a plurality of unit antennas (5-1, 5-2, 5-3) arranged in a predetermined direction. The plurality of antenna groups are arranged in the predetermined direction at equal intervals. The plurality of unit antennas in each of the plurality of antenna groups are arranged at two or more different intervals in the predetermined direction in an antenna device.

The azimuth detecting section includes a first detecting function of generating, for each of the antenna groups, reception information based on a received signal received by each of the unit antennas, and detecting an azimuth of the target based on the reception information for each of the antenna groups. The azimuth detecting section includes a second detecting function of (1) Using one of the plurality of antenna groups or at least two adjacent antenna groups in the plurality of antenna groups as a target group to generate, individually for each of the unit antennas of the target group, reception information based on the received signal received by the corresponding one of the unit antennas (2) Detecting an azimuth of the target based on the reception information for each of the unit antennas of the target group.

The target detecting device configured above uses the above-described antenna device as the receiving portion.

This obtains the same effects as the effects obtained by the antenna device.

Note that each of reference numerals in parentheses described in this [solution to problem] and claims described later represents a correspondence relation to a specific means described in embodiments described later as one aspect, and this does not limit the technical scope of the present invention.

BRIEF DESCRIPTION OF THE DRAWINGS

FIG. 4 is an explanatory diagram illustrating a configuration of a receiving antenna section of a third embodiment.

FIG. 5 is an explanatory diagram illustrating a configuration of a receiving antenna section of a fourth embodiment.

DESCRIPTION OF EMBODIMENTS

The following describes Illustrative embodiments of the present disclosure with reference to the accompanying drawings.

First Embodiment

Entire Configuration of an In-Vehicle Radar Device

Figure 1:
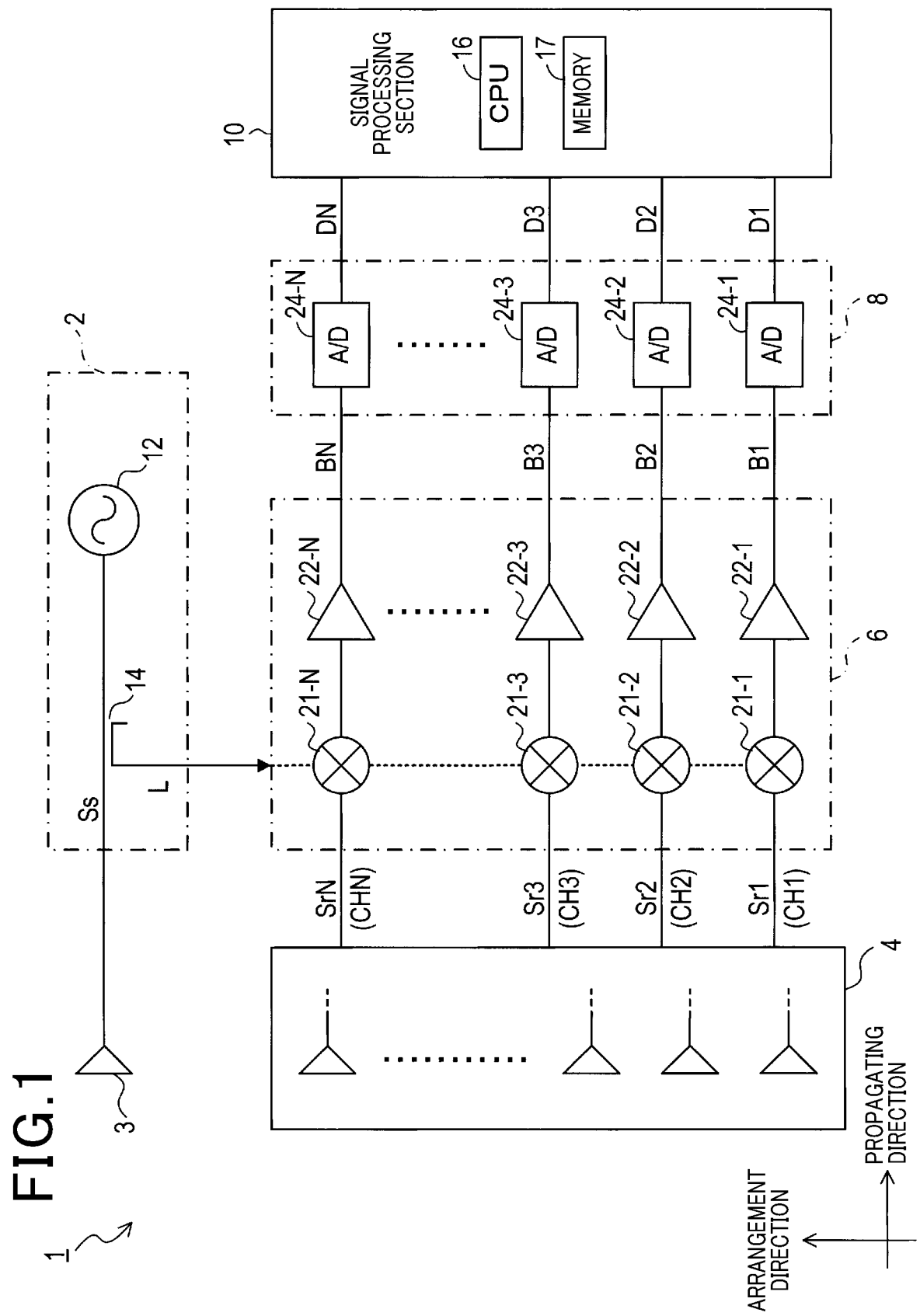
FIG. 1 is a block diagram illustrating a configuration of an in-vehicle radar device.

As shown in FIG. 1, an in-vehicle radar device 1 of the present embodiment includes a transmitter 2, a transmitting antenna 3, a receiving antenna section 4, a receiver 6, an AD converter unit 8, and a signal processing section 10.

The transmitter 2 transmits a radar wave signal in a millimeter-wave band through the transmitting antenna 3. When the radar wave signal transmitted from the transmitting antenna 3 is reflected by a target, such as a preceding vehicle or a roadside object, radar wave signals generated based on the reflection of the transmitted radar wave signal from the target, which will be referred to as reflected wave signals, are received by the receiving antenna section 4.

Note that the in-vehicle radar device 1 is mounted in the vehicle so that the radar wave signal is transmitted from the transmitting antenna 3 to the front side of the vehicle, for example. The receiving antenna section 4 has a plurality of unit antennas arranged in a row in a predetermined arrangement direction. The specific configuration of the receiving antenna section 4 will be described below in detail with reference to FIG. 2.

As described below, the receiving antenna section 4 includes receiving channels CH1 to CHN each of which is defined by a predetermined number of the unit antennas. The number N of the receiving channels is variably set depending on, for example, the number of the unit antennas constituting the receiving antenna section 4 and the configuration of an antenna group described below. At least four receiving channels are defined according to the present embodiment.

Note that the present embodiment includes one channel as a transmitting channel, but this is only one example. For example, the present embodiment can include a plurality of transmitting channels based on a plurality of transmitting antennas and transmitters.

Received signals Sr1 to SrN are output from the receiving antenna section 4 for the respective receiving channels CH1 to CHN on the basis of the received reflected wave signals. The received signals Sri (i=1, 2, ..., N) for the respective receiving channels CH1 to CHN output from the receiving antenna section 4 are input to the receiver 6.

The receiver 6 generates N beat signals B1 to BN corresponding to the respective received signals Sr1 to SrN on the basis of the received signals Sr1 to SrN for the respective receiving channels CH1 to CHN.

The AD converter unit 8 samples each of the beat signals B1 to BN generated by the receiver 6 to thereby convert each of the beat signals B1 to BN into digital data items (hereinafter referred to as beat signal data items) D1 to DN. The AD converter unit 8, more specifically, includes N AD converters 24-1 to 24-N corresponding to the N beat signals B1 to BN. Each AD converter 24-$i$ converts the corresponding beat signal Bi generated by the receiver 6 into the beat signal data item Di.

The signal processing section 10 captures the beat signal data items D1 to DN from the respective AD converters 24-1 to 24-N, and performs various kinds of processing on the basis of each of the beat signal data items D1 to DN.

The transmitter 2 includes a high-frequency oscillator 12 and a distributor 14.

The high-frequency oscillator 12 generates a high-frequency signal in a millimeter-wave band modulated so that a frequency linearly repeats a gradual increase and a gradual decrease or repeats any one of a gradual increase and a gradual decrease over time. That is, the high-frequency signal generated by the high-frequency oscillator 12 is comprised of alternately arranged up- and down-sweep sections or comprised of the up-sweep sections or the down-sweep sections continuously. Each up-sweep section represents a section of the high-frequency signal in which a frequency linearly and gradually increases, and each down-sweep section represents a section of the high-frequency signal in which a frequency linearly and gradually decreases.

The distributor 14 distributes output of the high-frequency oscillator 12, that is, the generated high-frequency signal to a transmission signal Ss and a local signal L.

The transmission signal Ss of the two signals distributed by the distributor 14 is supplied to the transmitting antenna 3. The radar wave signal is transmitted from the transmitting antenna 3 on the basis of the supplied transmission signal Ss. The local signal L of the two signals distributed by the distributor 14 is supplied to the receiver 6.

The receiver 6 includes N mixers 21-1 to 21-N and N amplifiers 22-1 to 22-N. The mixer 21-$i$ receives the received signal Sri of the channel CHi from the receiving antenna section 4. In addition, the amplifier 22-$i$ is connected to the mixer 21-$i$.

The mixer 21-$i$ mixes the received signal Sri of the corresponding receiving channel CHi with the local signal L to thereby generate the beat signal Bi that is a frequency component of the difference between the received signal Sri and the local signal L. The amplifier 22-$i$ amplifies the beat signal Bi generated by the mixer 21-$i$. The amplifier 22-$i$ may have a filter function of removing unnecessary high-frequency components from the beat signal Bi. The beat signal Bi amplified by the amplifier 22-$i$ is input to the AD converter 24-$i$.

The in-vehicle radar device 1 described above is configured such that (1) The radar wave signal, which is comprised of a frequency-modulated continuous wave (for example, FMCW), is transmitted from the transmitter 2 through the transmitting antenna 3

(2) Reflected wave signals generated based on reflection of the transmitted radar wave signal from a target are received by the respective unit antennas in the receiving antenna section 4

Each receiving channel Chi is configured such that the mixer 21-I mixes the received signal Sri with the local signal L sent from the transmitter 2 to thereby generate the beat signal Bi that is the frequency component of the difference between the received signal Sri and the local signal L. The beat signal Bi is amplified by the amplifier 22-$i$ with unnecessary high-frequency components removed. The amplified beat signal Bi, from which unnecessary high-frequency components have been removed, is repeatedly sampled to be converted into the beat signal data item Di by the AD converter 24-$i$.

The signal processing section 10 mainly includes a well-known microcomputer having, for example, a CPU 16 and a memory 17. The memory 17 may have, for example, at least one of a ROM, a RAM, a flash memory, and other various storage medium. The signal processing section 10 also includes input ports for inputting data from the AD converter unit 8, a digital signal processor (DSP) for executing Fast Fourier Transform (FFT) processing, and other devices.

Note that the signal processing section 10 can include one or a plurality of microcomputers. In addition, a part or all of functions implemented by the signal processing section 10 executing programs stored in the memory 17 can be implemented by use of hardware that is a mixture of logic circuits, analog circuits, and other hardware circuits.

The signal processing section 10 performs at least a target detecting task on the basis of each beat signal data item Di input thereto for the corresponding one of the receiving channels. The target detecting task is designed to obtain the azimuth in which the target having reflected the radar wave signal exists, the distance to the target, the relative speed relative to the target, and other pieces of information (hereinafter, the azimuth, the distance, the relative speed, and the other pieces of information will be collectively referred to also as "target information").

The CPU 16 reads, from the memory 17, one or more programs defining the target detecting task, and runs the one or more programs to thereby execute the target detecting task. The detailed information about the target detecting task will be schematically described below.

The signal processing section 10 of the present embodiment includes a long-distance narrow-angle detecting function and a short-distance wide-angle detecting function in accordance with the beat signal data items Di.

The long-distance narrow-angle detecting function is designed to detect, in a limited azimuth angle range, a target existing at a particularly remote location in front of the vehicle. The short-distance wide-angle detecting function is designed to detect, in a relatively wide azimuth angle range, a target existing at a particularly relatively near position in front of the vehicle. Executing the target detecting task enables the long-distance narrow-angle detecting function and short-distance wide-angle detecting function to be implemented.

Specifically, the target detecting task includes a long-distance narrow-angle detecting task for implementing the long-distance narrow-angle detecting function and a short-distance wide-angle detecting task for implementing the short-distance wide-angle detecting function. Note that the azimuth angle in the present embodiment means an azimuth angle in a horizontal plane.

The distance to a target precisely detectable in the long-distance narrow-angle detecting function is longer than the distance to the same target precisely detectable in the short-distance wide-angle detecting function. In contrast, the azimuth angle range precisely detectable in the short-distance wide-angle detecting function is wider than the azimuth angle range precisely detectable in the long-distance narrow-angle detecting function.

Configuration of a Receiving Antenna Section

Figure 2:
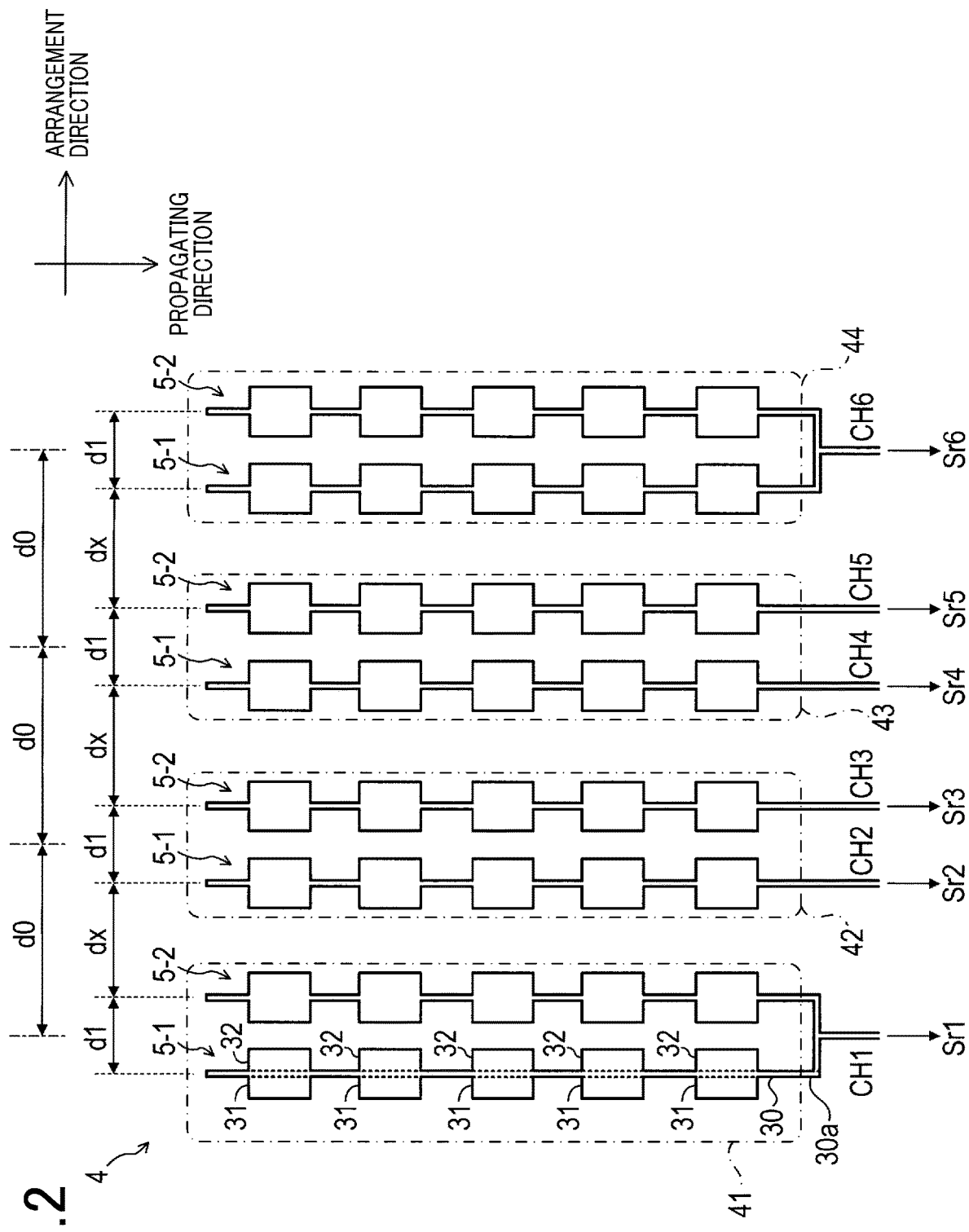
FIG. 2 is an explanatory diagram illustrating a configuration of a receiving antenna section of a first embodiment.

The following describes the configuration of the receiving antenna section 4 with reference to FIG. 2.

As shown in FIG. 2, the receiving antenna section 4 includes four antenna groups 41, 42, 43, 44.

Specifically, a first antenna group 41, a second antenna group 42, a third antenna group 43, and a fourth antenna group 44 are arranged in this order in a predetermined arrangement direction in a row at predetermined group intervals d0. Note that the arrangement direction is a direction substantially parallel to the horizontal plane and a propagating direction is a direction substantially perpendicular to the horizontal plane.

The first antenna group includes two unit antennas 5-1, 5-2. The first unit antenna 5-1 has a feeder line 30. The feeder line 30 is a linear transmission line provided to extend in the propagating direction that is a direction perpendicular to the arrangement direction.

The feeder line 30 has a left side, which is a side located on the opposite side (left side in the figure) relative to the arrangement direction. Five first radiation elements 31 are connected to the left side of the feeder line 30. These five first radiation elements 31 are arranged to the left side of the feeder line 30 at regular intervals along the propagating direction; each of the regular intervals is for example set to the length being substantially equal to the wavelength corresponding to a use frequency.

The feeder line 30 has a right side, which is a side located on the arrangement direction side (right side in the figure). Five second radiation elements 32 are connected to the right side of the feeder line 30. These five second radiation elements 32 are arranged to the right side of the feeder line 30 at regular intervals along the propagating direction; each of the regular intervals is for example set to the length being substantially equal to the wavelength corresponding to the use frequency.

In the present embodiment, as shown in FIG. 2, the five first radiation elements 31 connected to the left side of the feeder line 30 and the five second radiation elements 32 connected to the right side of the feeder line 30 are arranged at exactly identical positions on the propagation direction side. That is, the five first radiation elements 31 are symmetric to the respective five second radiation elements 32 with respect to the feeder line 30.

In the first unit antenna 5-1, one first radiation element 31, one second radiation element 32 arranged adjacent to the first radiation element 31 along the arrangement direction across the feeder line 30, and a region existing between the two radiation elements 31 and 32 in the entire feeder line 30 can collectively serve as one radiation element (hereinafter, referred to also as an "integrated radiation element"), which is formed by integrating the first radiation element 31, the second radiation element 32, and the region therebetween.

In other words, the first unit antenna 5-1 is configured such that five integrated radiation elements are connected to each other in series by the feeder line 30.

The first unit antenna 5-1 has opposing first and second ends, both of which correspond to the respective lower end and upper end in FIG. 2. The first end of the first unit antenna 5-1 is configured such that power feeding is performed at the first end. The second end of the first unit antenna 5-1 is terminated to prevent signals from being reflected from the second end. That is, the first unit antenna 5-1 is configured as a traveling-wave antenna.

The first unit antenna 5-1 of the present embodiment is comprised of a strip conductor mounted on one of both first and second surfaces of an unillustrated dielectric substrate. Note that, on the other of the first and second surfaces of the dielectric substrate, a ground plate comprised of a conductor is mounted. That is, the first unit antenna 5-1 is configured as a so-called microstrip array antenna in which a plurality of radiation elements are arranged in an array in the propagating direction.

When the first unit antenna 5-1 receives a reflected wave signal, the received signal is combined with a signal received at the second unit antenna 5-2. Then, the combined signal is output as the received signal Sr1 of the receiving channel CH1 to be input into the receiver 6.

The second unit antenna 5-2 is arranged at a position apart from the first unit antenna 5-1 by a predetermined antenna interval d1 in the arrangement direction. The configuration of the second unit antenna 5-2 is basically the same as that of the first unit antenna 5-1.

Each of the first unit antenna 5-1 and the second unit antenna 5-2 has a feeder terminal 30a. The feeder terminals 30a are connected to each other, so that, as described above, signals received at both the antennas 5-1 and 5-2 are combined to be output as the single received signal Sr1.

The three antenna groups 42, 43, 44 other than the first antenna group 41 are exactly identical to the first antenna group 41 in the point of including two unit antennas 5-1 and 5-2. The arrangement interval between the unit antennas 5-1 and 5-2 in each of the antenna groups 41 to 44 is equally set to the antenna interval d1.

However, in the second antenna group 42 arranged adjacent to the first antenna group 41, the feeder terminals of the first unit antenna 5-1 and the second unit antenna 5-2 are not connected to each other. In the second antenna group 42, signals received by the unit antennas 5-1 and 5-2 are individually output as the received signals Sri, respectively. That is, the signal received by the first unit antenna 5-1 is output as the received signal Sr2 of the receiving channel CH2, and the signal received by the second unit antenna 5-2 is output as the received signal Sr3 of the receiving channel CH3.

The third antenna group 43 arranged adjacent to the second antenna group 42 has exactly the same configuration as the configuration of the second antenna group 42. In the third antenna group 43, the signal received by the first unit antenna 5-1 is output as the received signal Sr4 of the receiving channel CH4, and the signal received by the second unit antenna 5-2 is output as the received signal Sr5 of the receiving channel CH5.

The fourth antenna group 44 arranged adjacent to the third antenna group 43 has exactly the same configuration as the configuration of the first antenna group 41. That is, in the fourth antenna group 44, the signals received by the first unit antenna 5-1 and the second unit antenna 5-2 are combined with each other at the feeder terminal to be output as a single received signal Sr6 corresponding to the receiving channel CH6.

Here, for two antenna groups adjacent to each other in the four antenna groups 41 to 44, an interval, which is called an adjacent group antenna interval, is defined between a closest unit antenna of one of the two antenna groups and a closest unit antenna of the other of the two antenna groups. The closest unit antenna of one of the two antenna groups is located closest to the other of the two antenna groups, and the closest unit antenna of the other of the two antenna groups is located closest to one of the two antenna groups.

All of the adjacent group antenna intervals between the antenna groups adjacent to each other in the four antenna groups 41 to 44 are set to the same value, that is, are set to an adjacent group antenna interval dx. Additionally, the adjacent group antenna interval dx is a value different from the antenna interval d1.

That is, the receiving antenna section 4 of the present embodiment is configured such that a plurality of (eight in the present embodiment) unit antennas are not arranged at equal intervals, but arranged alternately at two different intervals.

That is, the receiving antenna section 4 of the present embodiment is configured as a linear array antenna in which a plurality of unit antennas are arranged in an array in the arrangement direction.

Note that, in the present embodiment, the signal processing section 10 performs the short-distance wide-angle detecting task and long-distance narrow-angle detecting task in accordance with the received signals Sr1 to SrN (eventually, in accordance with the beat signal data items D1 to DN) of the respective receiving channels CH1 to CHN.

Then, the signal processing section 10 combines the detection results obtained by the respective detecting task to thereby generate a detection result of target information targeting a wide range covering a wide angle and a long distance in front of the vehicle.

The short-distance wide-angle detecting task is performed based on the received signals from the second antenna group 42 and third antenna group 43, that is, the received signals Sr2 to Sr5 corresponding to the respective four channels of the receiving channels CH2 to CH5 output from the four unit antennas alternately arranged at the antenna interval d1 and the adjacent group antenna interval dx.

That is, the short-distance wide-angle detecting task is performed based on a received signal output from each unit antenna, the feeder terminal of which is not connected to the other unit antennas, in the plurality of unit antennas.

The long-distance narrow-angle detecting task is performed based on the respective received signals Sr1 to SrN of all the receiving channels CH1 to CHN. However, as described below, the signal processing section 10 combines the beat signal data items Di for the respective antenna groups, and detects target information in the long distance on the basis of the combined data.

Note that, as for the first antenna group 41 and the fourth antenna group 44, the received signals of the respective unit antennas have been already analog-synthesized at the time of being input into the receiver 6, and the combined received signals Sr1 and Sr6 are input to the first and second antenna groups 41 and 44, respectively. The first beat signal data item D1 and the fourth beat signal data item D4 are therefore independently processed without being combined with another beat signal data item.

As described above, in the long-distance narrow-angle detecting task, one processing information item is generated for each antenna group inside the signal processing section 10, and the target information is detected based on the processing information items. That is, when performing the long-distance narrow-angle detecting task, the signal processing section 10 regards each antenna group as a single antenna. That is, in the long-distance narrow-angle detecting task, the receiving antenna section 4 becomes equivalent to the linear array in which four linear antennas are arranged at the group interval d0 longer than the antenna interval d1 and the adjacent group antenna interval dx.

Note that the number of antenna groups is hereinafter referred to as a group number G. In addition, the number of unit antennas included in one antenna group is hereinafter referred to as an internal unit antenna number P. In the present embodiment, the group number G is four, and the internal unit antenna number P is two. In addition, the receiving channel number N is six.

In the antenna group located at either end in the arrangement direction of the plurality of antenna groups constituting the receiving antenna section 4, the unit antennas 5-1 and 5-2 cannot be connected to each other at their feeder terminals. Additionally, the group number G set to four and the internal unit antenna number P set to two are just one example.

The receiving channel number N can be changed depending on the group number G or the internal unit antenna number P, and also can be changed depending on connection information indicative of whether the unit antennas in the antenna group at either side of the unit antennas are connected at their feeder terminals.

Let us describe hereinafter other examples of the receiving antenna section 4; each example is configured such that at least one of the group number G, the internal unit antenna number P, and the connection information is set to be different from the receiving antenna 4 according to the present embodiment.

Target Detecting Task

The CPU 16 of the signal processing unit 10 is configured to periodically perform the target detecting task at predetermined time intervals after the in-vehicle radar device 1 is activated (in the present embodiment, for example, after the ignition switch of the vehicle is turned on).

Upon launching the target detecting task, the signal processing section 10 controls the high-frequency oscillator 12 to transmit the radar wave signal from the transmitting antenna 3. When the radar wave signal is transmitted, in a case where a target exists in front of the vehicle, the radar wave signal is reflected by the target, so that reflected wave signals are received by the receiving antenna section 4, and the respective received signals Sr1 to SrN for the respective receiving channels CH1 to CHN are output from the receiving antenna section 4.

The signal processing section 10 actuates the respective AD converters 24-1 to 24-N to acquire the beat signal data D1 to DN.

Next, the signal processing section 10 performs frequency analysis (in the present embodiment, for example, FFT processing) on the acquired respective beat signal data D1 to DN to thereby obtain, for each of the up-sweep section and down-sweep section, a power spectrum (i.e. frequency spectrum) of each of the beat signal data D1 to DN for the corresponding receiving channels CH1 to CHN.

Then, the signal processing section 10 generates, for each of the antenna groups arranged at the group intervals d0, a group spectrum that is a power spectrum of the corresponding antenna group. Then, the signal processing section 10 performs the long-distance narrow-angle detecting task on the basis of the group spectrum for each of the antenna groups.

The signal processing section 10 performs the long-distance narrow-angle detecting task as follows.

Specifically, the signal processing section 10 combines, for each antenna group, corresponding spectrums in the power spectrums of the receiving channels CH1 to CHN to thereby obtain the group spectrum for each antenna group.

The signal processing unit 10 of the present embodiment performs, as the long-distance narrow-angle detecting task, vector-synthesis of the FFT results (specifically, each of a real part and an imaginary part) of the beat signal data items for each antenna group to thereby derive the group spectrum for each antenna group.

Note that, in the present embodiment, the received signals from the two unit antennas of each of the antenna groups 41 and 44 are analog-synthesized to be output to the receiver 6, and then processed as a received signal of one receiving channel.

The long-distance narrow-angle detecting task therefore does not vector-synthesize the beat signal data item D1 of the receiving channel CH1 based on the received signal Sr1 from the first antenna group 41 with the FFT result of the other beat signal data items, thus deriving the group spectrum based on the beat signal data item D1 independently. Similarly, the long-distance narrow-angle detecting task does not vector-synthesize the beat signal data item D6 of the receiving channel CH6 based on the received signal Sr6 from the fourth antenna group 44 with the FFT result of the other beat signal data items, thus deriving the group spectrum based on the beat signal data item D6 independently.

For the second antenna group 42, the respective received signals Sr2 and Sr3 are individually output from the respective two unit antennas 5-1 and 5-2. The long-distance narrow-angle detecting task therefore vector-synthesizes the respective power spectra of the receiving channels CH2 and CH3 corresponding to the respective received signals Sr2 and Sr3 to thereby derive the group spectrum corresponding to the second antenna group 42.

For the third antenna group 43, the long-distance narrow-angle detecting task vector-synthesizes the respective power spectra of the receiving channels CH4 and CH5 corresponding to the respective received signals Sr4 and Sr5 to thereby derive the group spectrum corresponding to the third antenna group 43 in the same manner as with the second antenna group 42

That is, the long-distance narrow-angle detecting task derives the group spectrum for each antenna group, which is equivalent to the result obtained by individually performing FFT processing on each of the received signals from the four unit antennas arranged at the group interval d0 to derive the corresponding group spectrum.

The signal processing section 10 performs, based on the derived group spectrums, azimuth analysis of the target using a well-known multiple signal classification (MUSIC) algorithm. Then, the signal processing section 10 generates a distance to the target, a relative speed relative to the target, and other information using a well-known method employed by FMCW radar devices. This results in the target information including the azimuth of the target being generated.

The long-distance narrow-angle detecting task of the present embodiment derives the group spectrum for each of the antenna groups arranged at the relatively large intervals d0, which are longer than the intervals between the adjacent unit antennas, to thereby generate the target information.

In the long-distance narrow-angle detecting task, although a precisely-detectable azimuth angle range (hereinafter, referred to also as a long-distance narrow-angle range) is narrower than a precisely-detectable azimuth angle range in the short-distance wide-angle detecting task (hereinafter, referred to also as a short-distance wide-angle range), it is possible to precisely detect a target at a remote position in front of the own vehicle.

The signal processing section 10 performs the short-distance wide-angle detecting task after the long-distance narrow-angle detecting task.

Specifically, the signal processing section 10 extracts, as the short-distance wide-angle detecting task, the power spectrums based on the respective received signals from the unit antennas, the feeder terminals of which are not connected to another unit antenna.

Each of the second antenna group 42 and the third antenna group 43 according to the present embodiment is configured such that the unit antenna 5-1 output the received signals Sr2 and Sr3, and the unit antenna 5-2 outputs the received signals Sr4 and Sr5.

There, the signal processing section 10 extracts the power spectrum for each of the beat signal data items D2 to D5 based on the respective received signals Sr2 to Sr5 of the receiving channels CH2 to CH5. Next, the signal processing section 10 detects, for each extracted power spectrum, a frequency peak existing on the corresponding power spectrum (that is, detects a target candidate).

The power spectrum for each of the receiving channels CH2 to CH5 shows the result of individually performing FFT processing on the corresponding one of the received signals Sr2 to Sr5 from the four unit antennas arranged at the intervals narrower than the group intervals d0.

The signal processing section 10 performs azimuth analysis of estimating an azimuth in which the target candidate exists, based on the power spectrum for each of the receiving channels CH2 to CH5.

Note that, in the present embodiment, the signal processing section 10 performs the azimuth analysis using, as one example, a well-known digital beam-forming (so-called DBF) method of detecting an azimuth in which a target (target candidate) exists using a main lobe of an array antenna. In addition, the signal processing section 10 also generates a distance to the target candidate, a relative speed relative to the target candidate, and other information about the target candidate using well-known methods available by FMCW radar devices.

As described above, the signal processing section 10 generates target information (information on target candidate) in the short-distance wide-angle range.

The short-distance wide-angle detecting task of the present embodiment derives the group spectrum for each of the four unit antennas arranged at the relatively narrow intervals d1 and the adjacent group antenna intervals dx, which are narrower than the group intervals d0, to thereby generate the target information. Although a precisely-detectable distance is shorter than that in the long-distance narrow-angle detecting task, it is possible to precisely detect a target existing in a wide angle range in front of the own vehicle, that is, in the short-distance wide-angle range wider than the long-distance narrow-angle range.

Additionally, the total four unit antennas of the second antenna group 42 and the third antenna group 43 are not arranged at equal intervals but arranged at two different intervals of two kinds according to the present embodiment. Specifically, the interval between the unit antenna (hereinafter, referred to also as a CH2 unit antenna) 5-1 corresponding to the receiving channel CH2 and the unit antenna (hereinafter, referred to also as a CH3 unit antenna) 5-2 corresponding to the receiving channel CH3 is set to the antenna interval d1. In contrast, the interval between the CH3 unit antenna and the unit antenna (hereinafter, referred to also as a CH4 unit antenna) 5-1 corresponding to the receiving channel CH4 is set to the adjacent group antenna interval dx, which is different from the antenna interval d1.

In addition, the interval between the CH4 unit antenna and the unit antenna (hereinafter, referred to also as a CH5 unit antenna) 5-2 corresponding to the receiving channel CH5 is set to the antenna interval d1.

As described above, the four unit antennas used for target detection in the short-distance wide-angle range are arranged not at equal intervals but at two different intervals. This therefore makes it possible to obtain a more precise target detection result in which grating ghosts are suppressed in the short-distance wide-angle detecting task.

The following schematically describes the principle based on the arrangement of the plurality of unit antennas at different intervals, such as two different intervals, for target detection in the short-distance wide-angle range, which is capable of reducing grating ghosts more than the arrangement of the plurality of unit antennas at equal intervals.

In a so-called electronic scanning radar, such as the in-vehicle radar device 1 of the present embodiment, at the time of azimuth analysis, grating lobes each having an equal peak level are repeatedly generated at constant azimuth intervals together with an azimuth spectrum for a true target. That is, it is not possible to determine, only with simple azimuth analysis, which is a true target in which of the grating lobe azimuths.

The phenomenon in which a target in an azimuth that is not originally required to be detected appears consequently in a detection area as a grating lobe is called a grating ghost.

The azimuth of each grating lobe is determined by receiving antenna interval. The receiving antenna intervals mentioned here exist in the number of combinations of arbitrary two channels in a case where three or more receiving channels exist. That is, for example in a case of four unit antennas, six receiving antenna intervals exist.

In a case of, for example, four unit antennas, when the four unit antennas are arranged at equal intervals, all of the six receiving antenna intervals are integer multiple of the minimum antenna interval (that is, an interval between adjacent unit antennas).

In this case, in an azimuth in which a grating lobe is generated by the minimum antenna interval, the grating lobe is generated also by the integer multiple of the receiving antenna interval. This results in, when angle measuring results of all channel combinations are combined, a sharp grating lobe appears in an azimuth determined by the minimum antenna interval.

However, in a case where four unit antennas are arranged at two or more intervals (for example, two kinds of intervals dx and interval d1), many receiving antenna intervals, which are not integer multiple of the minimum antenna interval d1, exist. As a result, even if the angle measuring results of all channel combinations are combined, since the azimuth of each grating lobe is different, the peak level of the combined grating lobe becomes lower compared with the azimuth spectrum of the true target. That is, occurrence of the grating ghost can be suppressed.

Note that, it is desirable to define the long-distance narrow-angle range and short-distance wide-angle range from a directional gain of an antenna used for each azimuth analysis and an angular range in which the grating lobe is not generated. Specifically, it is common to define the angular range less than ± arcsin {λ/(2·dm)} with respect to the wavelength λ of the radio wave signal and the antenna minimum intervals dm.

The signal processing section 10, after performing the long-distance narrow-angle detecting task and short-distance wide-angle detecting task as described above, overlaps the detection results of the respective detecting tasks. Specifically, the signal processing section 10 of the present embodiment removes, from targets detected by the short-distance wide-angle detecting task, some targets that also exist in the long-distance narrow-angle range to thereby obtain remaining targets. Then, the signal processing section 10 adds the remaining targets to the targets in the long-distance narrow-angle range detected by the long-distance narrow-angle detecting task, thereby overlapping the detection results by the both detecting tasks.

The target information obtained by the operations so far is provisional target information, that is, information on target candidates, and not yet fixed. Then, the signal processing section 10 further performs well-known target identifying processing to fix a target from among the target candidates. That is, the signal processing section 10 identifies a probable target from among the target candidates.

Note that, as processing for acquiring target information, the above target detecting task is just one example. That is, the signal processing section 10 can use, based on the respective received signals Sr1 to SrN from the receiving antenna section 4, another signal processing method capable of precisely detecting both targets, each of which exists in the long-distance narrow-angle range at a long distance in front of the vehicle, and targets, each of which exists in the short-distance wide-angle range at a short distance in front of the vehicle.

Effects of the First Embodiment

As described above, the in-vehicle radar device 1 of the first embodiment includes the receiving antenna section 4 in which the plurality of antenna groups 41 to 44 are arranged in the arrangement direction at equal intervals. Each of the antenna groups 41 to 44 has the same configuration. Specifically, each of the antenna groups 41 to 44 has two unit antennas 5-1 and 5-2 of the same configuration. The two unit antennas 5-1 and 5-2 are arranged in the arrangement direction apart from each other by the antenna interval d1. In addition, all of the adjacent group antenna intervals dx between the two adjacent antenna groups are the same, and the adjacent group antenna intervals dx are different from the antenna intervals d1.

As the entire receiving antenna section 4, the intervals between the adjacent unit antennas are therefore alternately intervals of two kinds, such as the antenna interval d1, the adjacent group antenna interval dx, the antenna interval d1, the adjacent group antenna interval dx, the antenna interval d1, . . . in the arrangement direction.

Then, the signal processing section 10 uses, in the long-distance narrow-angle detecting task, the FFT processing result combined for each of the antenna groups to thereby detect the azimuth of a target in the long-distance narrow-angle range. Because the respective antenna groups 41 to 44 are arranged at equal intervals, it is possible to detect the azimuth of a target in the long distance while maintaining a high angle performance.

In addition, the signal processing section 10 performs, in the short-distance wide-angle detecting task, signal processing based on the respective received signals Sr2 to Sr5 from the second antenna group 42 and the third antenna group 43, the unit antennas of which are not connected at their feeder terminal ends, of the antenna groups 41 to 44.

Specifically, the signal processing section 10 detects the azimuth of a target in the short-distance wide-angle range by using the FFT processing result for each of the received signals Sr2 to Sr5.

The respective unit antennas of the second antenna group 42 and the third antenna group 43 are, as a whole, alternately arranged at different intervals of two kinds (d1, dx). It is therefore possible to appropriately detect, based on the FFT processing result for each of the received signals Sr2 to Sr5, the azimuth of a target in the short-distance wide-angle range while reducing erroneous detection due to the grating ghosts and maintaining an angle performance.

Correspondence Relation with Claims

The following describes a correspondence relation between wording in the present embodiment and wording in the claims.

The in-vehicle radar device 1 corresponds to an example of a target detecting device, and the receiving antenna section 4 corresponds to an example of an antenna device and a receiving portion.

The arrangement direction corresponds to a predetermined direction.

The transmitter 2 and the transmitting antenna 3 correspond to an example of a transmitting portion, and the receiver 6, the AD converter unit 8, and the signal processing section 10 correspond to an example of an azimuth detecting section.

Additionally, the long-distance narrow-angle range corresponds to a first azimuth angle range, and the short-distance wide-angle range corresponds to a second azimuth angle range.

In addition, the long-distance narrow-angle detecting function corresponds to an example of a first detecting function, and the short-distance wide-angle detecting function corresponds to an example of a second detecting function.

Moreover, the FFT processing result from the signal processing section 10 corresponds to an example of reception information.

Second Embodiment

Figure 3:
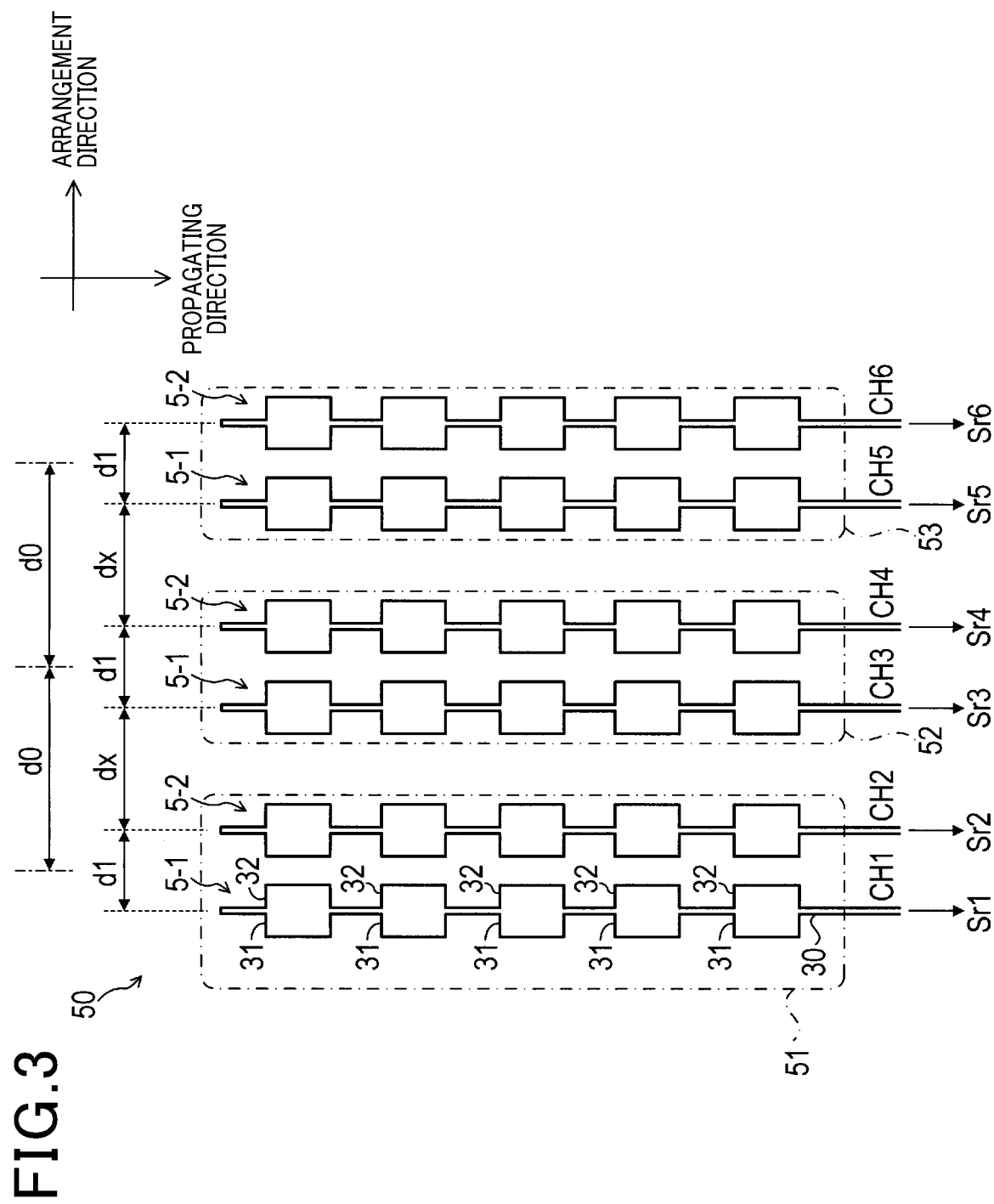
FIG. 3 is an explanatory diagram illustrating a configuration of a receiving antenna section of a second embodiment.

The following describes a specific example of a configuration of a receiving antenna section constituting the in-vehicle radar device 1 according to the second embodiment with reference to FIG. 3; the configuration of the receiving antenna section is different from the configuration of the receiving antenna section 4 of the first embodiment shown in FIG. 2, constituting the in-vehicle radar device 1.

Referring to FIG. 3, a receiving antenna section 50 of the second embodiment includes three antenna groups of a first antenna group 51, a second antenna group 52, and a third antenna group 53. These three antenna groups 51, 52, and 53 are arranged in this order in a row at group intervals d0 in the arrangement direction.

In addition, the configuration of each of the antenna groups 51, 52, and 53 is exactly the same as that of the second antenna group 42 in the receiving antenna section 4 of the first embodiment shown in FIG. 2. Thus, all of the adjacent group antenna intervals between antenna groups adjacent to each other in the three antenna groups 51 to 53 are dx as in the first embodiment.

That is, the receiving antenna section 50 of the present second embodiment is configured such that six unit antennas are alternately arranged at different intervals of the antenna interval d1 and the adjacent group antenna interval dx.

Then, the received signals are individually output from the respective unit antennas to be input into the receiver 6.

That is, in the first antenna group 51, the signal received at the first unit antenna 5-1 is output as the received signal Sr1 of the receiving channel CH1, and the signal received at the second unit antenna 5-2 is output as the received signal Sr2 of the receiving channel CH2.

Additionally, in the second antenna group 52, the signal received at the first unit antenna 5-1 is output as the received signal Sr3 of the receiving channel CH3, and the signal received at the second unit antenna 5-2 is output as the received signal Sr4 of the receiving channel CH4.

In addition, in the third antenna group 53, the signal received at the first unit antenna 5-1 is output as the received signal Sr5 of the receiving channel CH5, and the signal received at the second unit antenna 5-2 is output as the received signal Sr6 of the receiving channel CH6.

As described above, the receiving antenna section 50 of the present second embodiment is configured such that the group number G is set to 3, the internal unit antenna number P is se to 2, and the receiving channel number N is set to 6.

The signal processing section 10 of the second embodiment including the receiving antenna section 50 configured above performs the target detecting task, which is partially different from the target detecting task described in the first embodiment.

That is, the long-distance narrow-angle detecting task and short-distance wide-angle detecting task are performed in the target detecting task of the second embodiment. The long-distance narrow-angle detecting task vector-synthesizes the FFT processing results of the beat signal data item Di for each of the three antenna groups 51, 52, and 53 to thereby derive the group spectrum for each of the antenna groups.

That is, the long-distance narrow-angle detecting task vector-synthesizes, for the first antenna group 51, the FFT processing results of the beat signal data items D1 and D2 corresponding to the respective receiving channels CH1 and CH2 from the first antenna group 51 to derive one group spectrum.

The long-distance narrow-angle detecting task vector-synthesizes, similarly for the second antenna group 52, the FFT processing results of the beat signal data D3 and D4 corresponding to the respective receiving channels CH3 and CH4 from the second antenna group 52 to derive one group spectrum.

The long-distance narrow-angle detecting task vector-synthesizes, similarly for the third antenna group 53, the FFT processing results of the beat signal data D5 and D6 corresponding to the respective receiving channels CH5 and CH6 from the third antenna group 53 to derive one group spectrum.

Then, the signal processing section 10 performs the azimuth analysis using the well-known MUSIC algorithm on the basis of the group spectrum for each of the three antenna groups. This makes it possible to precisely detect a target in the long distance in the long-distance narrow-angle range in front of the vehicle.

In contrast, the short-distance wide-angle detecting task extracts the power spectrum for each of the beat signal data items D1 to D6 based on the respective received signals Sr1 to Sr6 of all the receiving channels CH1 to CH6. Then, the short-distance wide-angle detecting task performs the azimuth analysis using, for example, the well-known DBF method, on the basis of the extracted power spectrums.

The above-described receiving antenna section 50 of the second embodiment and the in-vehicle radar device 1 using the receiving antenna section 50 achieve the same effects as the effects achieved in the first embodiment.

Third Embodiment

The following describes a specific example of a configuration of a receiving antenna section constituting the in-vehicle radar device 1 according to the third embodiment with reference to FIG. 4; the configuration of the receiving antenna is different from the configuration of the receiving antenna section 4 of the first embodiment shown in FIG. 2 and the configuration of the receiving antenna section 50 of the second embodiment shown in FIG. 3.

As is evident from the comparison between FIG. 2 and FIG. 4, a receiving antenna section 60 of the third embodiment shown in FIG. 4 is different in the relative positional relation of the two unit antennas 5-1 and 5-2 in each of the antenna groups 61 to 64, compared with the receiving antenna section 4 of the first embodiment shown in FIG. 2.

More specifically, the relative positional relation of the two unit antennas 5-1 and 5-2 in the propagating direction according to the third embodiment is different from the relative positional relation of the two unit antennas 5-1 and 5-2 according to the first embodiment.

As shown in FIG. 2, in the third embodiment, in one antenna group, the second unit antenna 5-2 is arranged to be shifted by a predetermined distance with respect to the first unit antenna 5-1 in the propagating direction. The interval between the two unit antennas 5-1 and 5-2 in the arrangement direction (that is, the antenna interval d1) is the same as that in the first embodiment. In addition, the group intervals of the respective antenna groups 61 to 64 are also set to d0 as with the first embodiment.

In the receiving antenna section 60 of the present third embodiment, each of the antenna groups 61 to 64 is configured such that the first unit antenna 5-1 and the second unit antenna 5-2 are arranged to be shifted from each other in the propagating direction.

This results in the receiving antenna section 60 of the present third embodiment being configured such that, as a whole, the six unit antennas are arranged staggered in the arrangement direction.

Note that the third embodiment is basically the same as the first embodiment except that, in each of the antenna groups 61 to 64, the first unit antenna 5-1 and the second unit antenna 5-2 are arranged to be shifted from each other in the propagating direction. The operations of the signal processing section 10 according to the third embodiment are the same as the operations of the signal processing section according to the first embodiment.

The receiving antenna section 60 of the present third embodiment and the in-vehicle radar device 1 using the receiving antenna section 60 therefore achieve the same effects as the effects achieved in the first embodiment. Additionally, because the respective unit antennas of the receiving antenna section 60 are arranged staggered in the arrangement direction, it is also possible to detect an azimuth in the vertical direction.

Fourth Embodiment

The following describes a specific example of a configuration of a receiving antenna section constituting the in-vehicle radar device 1 according to the fourth embodiment with reference to FIG. 5; the configuration of the receiving antenna is different from the configuration of the receiving antenna section 4 of the first embodiment shown in FIG. 2, the configuration of the receiving antenna section 50 of the second embodiment shown in FIG. 3, and the configuration of the receiving antenna section 60 of the fourth embodiment shown in FIG. 4.

A receiving antenna section 70 of the fourth embodiment shown in FIG. 5 includes four antenna groups of a first antenna group 71, a second antenna group 72, a third antenna group 73, and a fourth antenna group 74. These four antenna groups 71, 72, 73, and 74 are arranged in this order in a row in the arrangement direction, at the same group intervals d0.

The configuration of each of the antenna groups 71 to 74 is the same. Thus, the following describes a specific configuration of the first antenna group 71 hereinafter while omitting the descriptions of the other antenna groups 72 to 74.

The first antenna group 71 includes three unit antennas of a first unit antenna 5-1, a second unit antenna 5-2, and a third unit antenna 5-3. The configuration of each of the unit antennas is the same as that of the unit antenna described in each of the other embodiments.

The second unit antenna 5-2 is arranged at a position apart from the first unit antenna 5-1 by a first antenna interval d1 in the arrangement direction. In addition, the third unit antenna 5-3 is arranged at a position apart from the second unit antenna 5-2 by a second antenna interval d2 in the arrangement direction.

The value of the first antenna interval d1 is different from that of the second antenna interval d2. That is, the three unit antennas 5-1, 5-2, and 5-3 in the first antenna group 71 are arranged in the arrangement direction at the different intervals d1 and d2.

In addition, the three unit antennas 5-1, 5-2, and 5-3 are arranged at different positions in the propagating direction, respectively.

That is, the second unit antenna 5-2 is arranged to be shifted by a predetermined distance from the first unit antenna 5-1 in the propagating direction. The third unit antenna 5-3 is arranged to be shifted by a predetermined distance from the second unit antenna 5-2 in the propagating direction, and in addition is arranged to be shifted by a predetermined distance also from the first unit antenna 5-1 in a direction opposite to the propagating direction.

The first antenna group 71 is therefore configured, as a whole, such that the three unit antennas 5-1, 5-2, and 5-3 are arranged in zigzag in the arrangement direction.

In addition, in the four antenna groups 71 to 74, all of the adjacent group antenna intervals between antenna groups adjacent to each other are the same value, that is, the adjacent group antenna intervals dx.

Additionally, each of the adjacent group antenna intervals dx is set to a value different from both of the first antenna interval d1 and the second antenna interval d2.

That is, the receiving antenna section 4 of the present fourth embodiment is configured such that a plurality of (12, in the present embodiment) unit antennas are alternately arranged at three different intervals; the first antenna interval d1, second antenna interval d2, and adjacent group antenna interval dx.

In addition, in the first antenna group 71, the three unit antennas 5-1, 5-2, and 5-3 are connected with each other at their feeder terminal ends. From the first antenna group 71, signals received by the three unit antennas 5-1, 5-2, and 5-3 are therefore combined and output as a received signal Sr1 of a receiving channel CH1. Similarly for the fourth antenna group 74, the three unit antennas 5-1, 5-2, and 5-3 are connected with each other at their feeder terminal ends. From the fourth antenna group 74, signals received by the three unit antennas 5-1, 5-2, and 5-3 are therefore combined and output as a received signal Sr8 of a receiving channel CH8.

In contrast, in the second antenna group 72, signals received by the unit antennas 5-1, 5-2, and 5-3 are individually output as received signals Sri, respectively. That is, the signal received at the first unit antenna 5-1 is output as a received signal Sr2 of a receiving channel CH2, the signal received at the second unit antenna 5-2 is output as a received signal Sr3 of a receiving channel CH3, and the signal received at the third unit antenna 5-3 is output as a received signal Sr4 of a receiving channel CH4.

This is similar also for the third antenna group 73. That is, in the third antenna group 73, the signal received by the first unit antenna 5-1 is output as a received signal Sr5 of a receiving channel CH5, the signal received by the second unit antenna 5-2 is output as a received signal Sr6 of a receiving channel CH6, and the signal received by the third unit antenna 5-3 is output as a received signal Sr7 of a receiving channel CH7.

As described above, the receiving antenna section 4 of the present fourth embodiment is configured such that the group number G is set to 4, the internal unit antenna number P is set to 3, and the receiving channel number N is set to 8.

The signal processing section of the fourth embodiment including the receiving antenna section 4 configured above performs the target detecting task, which is partially different from the target detecting task described in the first embodiment.

That is, the long-distance narrow-angle detecting task and short-distance wide-angle detecting task are performed in the target detecting task of the fourth embodiment. The long-distance narrow-angle detecting task vector-synthesizes the FFT processing results of the beat signal data item Di for each of the four antenna groups 71 to 74 to derive the group spectrum for each of the antenna groups.

That is, the long-distance narrow-angle detecting task vector-synthesizes, for the second antenna group 72, the FFT processing results of the beat signal data items D2, D3, and D4 corresponding to the respective receiving channels CH2, CH3, and CH4 from the second antenna group 72 to derive one group spectrum.

The long-distance narrow-angle detecting task vector-synthesizes, similarly for the third antenna group 73, the FFT processing results of the beat signal data items D5, D6, and D7 corresponding to the respective receiving channels CH5, CH6, and CH7 from the third antenna group 73 to derive one group spectrum.

In contrast, for each the first antenna group 71 and the fourth antenna group 74, the long-distance narrow-angle detecting task analog-synthesizes the signals received at the unit antennas 5-1, 5-2, and 5-3 to output the resultant signal as one received signal in the same manner as the first embodiment. Thus, the signal processing method based on the received signal Sr1 from the first antenna group 71, and the signal processing method based on the received signal Sr8 from the fourth antenna group 74 are the same as in the first embodiment.

Then, the signal processing section 10 performs the azimuth analysis using the well-known MUSIC algorithm on the basis of the group spectrum for each of the four antenna groups. This makes it possible to precisely detect a target in the long distance existing in the long-distance narrow-angle range in front of the vehicle.

The short-distance wide-angle detecting task extracts the power spectrum for each of the beat signal data items D2 to D7 based on the respective received signals Sr2 to Sr7 of the receiving channels CH2 to CH7 from the second antenna group 72 and the third antenna group 73. Then, the short-distance wide-angle detecting task detects, based on the extracted power spectrums, the azimuth of a target in the short-distance wide-angle range.

The receiving antenna section 70 of the fourth embodiment and the in-vehicle radar device 1 using the receiving antenna section 60 therefore achieve the same effects as the effects achieved in the first embodiment.

Modifications

The embodiments of the present disclosure have been described above, but the present disclosure is not limited to the above embodiments, and can be variably modified.

The group number G of the antenna groups of the receiving antenna section in each of the first to fourth embodiments is not limited to the group number G (for example, G=3, 4) shown in the above corresponding embodiment. The group number G can be set to 2, 5, or a value more than 5.

The internal unit antenna number P representing the number of unit antennas of one antenna group of the receiving antenna section in each of the first to fourth embodiments is not limited to the number (for example, P=2, 3) shown in the above corresponding embodiment. The internal unit antenna number P can be set to 4 or more.

In a case where one antenna group of the receiving antenna section in each of the first to fourth embodiments has three or more unit antennas, the antenna intervals between adjacent unit antennas in the antenna group may be equal or may be at least two different intervals. Note that the fourth embodiment is one example of a configuration in which a plurality of unit antennas in an antenna group is arranged at different intervals.

In a case where one antenna group of the receiving antenna section in each of the first to fourth embodiments has three or more unit antennas, when a plurality of unit antennas in the antenna group are arranged at equal intervals, the adjacent group antenna intervals dx need to be set different from the antenna intervals between the unit antennas.

In contrast, in a case where one antenna group of the receiving antenna section in each of the first to fourth embodiments has three or more unit antennas, when a plurality of unit antennas in the antenna group are arranged at two or more different antenna intervals, the adjacent group antenna intervals dx can have the same value as any of the two or more different antenna intervals.

In the first embodiment, the third embodiment, and the fourth embodiment, each of the two antenna groups located on both end sides in the arrangement direction in a plurality of antenna groups is configured such that a plurality of unit antennas are connected with each other at their feeder terminal ends, but it is not essential to connect the feeder terminal ends with each other. Each antenna group according to the first embodiment, the third embodiment, and the fourth embodiment can be configured to individually output received signals for the respective unit antennas without the feeding points of the unit antennas being connected to each other, which is similar to the receiving antenna section 50 of the second embodiment.

In contrast, at least one another antenna group in addition to the antenna groups at both ends can be configured such that respective unit antennas are connected to each other at their feeding points, and can analog-synthesize signals received by the respective unit antennas, thus outputting the resultant signal as one received signal, which is similar to the antenna groups of both ends.

A shape and a configuration of the unit antenna are not limited to the shape and configuration shown in each of the above embodiments. That is, the number and shape of the radiation elements connected to the feeder line 30 can be appropriately determined. In addition, the connecting position and connecting pitch (that is, an interval in the propagating direction) of the radiation elements to the feeder line 30 may be also appropriately determined. In addition, the feeder line 30 is not required to be straight but may be formed so as to extend in the propagating direction as a whole. That is, for example, it can partially have a flection, or may have a wavelike shape.

A specific configuration and a detecting method for detecting the azimuth of a target on the basis of the respective received signals Sr1 to SrN for the respective channels CH1 to CHN by the signal processing section 10 are not limited to the configurations and detecting methods described in the above embodiments.

If it is possible to appropriately detect each of a target in the long-distance wide-angle range and a target in the short-distance narrow-angle range consequently on the basis of the respective received signals Sr1 to SrN, and particularly for the short-distance narrow-angle range, to obtain a detection result in which the grating ghost is suppressed while the angle performance is maintained, the signal processing section 10 can employ another circuit configuration or another detecting method.

A function of one component in each of the above embodiments can be distributed as a plurality of components or functions of a plurality of components can be integrated into one component. In addition, a part of a configuration of each of the above embodiments can be omitted. At least part of a configuration of each of the above embodiments can be added to or replaced with configuration of another embodiment. Note that any aspect included in a technical idea specified by only the wording of the claims is an embodiment of the present invention.

REFERENCE SIGNS LIST

1 . . . In-vehicle radar device
2 . . . Transmitter
3 . . . Transmitting antenna
4, 50, 60, 70 . . . Receiving antenna section
5-1, 5-2, 5-3 . . . Unit antenna
6 . . . Receiver
8 . . . AD converter
10 . . . Signal processing section
12 . . . High-frequency oscillator
14 . . . Distributor
16 . . . CPU
17 . . . Memory
21 . . . Mixer
22 . . . Amplifier
24 . . . AD converter
30 . . . Feeder line
30a . . . Feeder terminal
31 . . . First radiation element
32 . . . Second radiation element
41 to 44, 51 to 53, 61 to 64, 71 to 74 . . . Antenna group

The invention claimed is:

1. An antenna device for receiving a radio wave signal, the antenna device comprising:
a plurality of antenna groups, each of the antenna groups including a plurality of unit antennas arranged in a predetermined direction at equal first intervals in each of the antenna groups, wherein:
each of the unit antennas comprises a plurality of radiation elements that are linearly arranged such that each unit antenna constitutes a respective array antenna;
the plurality of antenna groups are arranged in the predetermined direction at equal second intervals, the first intervals being different from the second intervals; and
the plurality of unit antennas across the plurality of antenna groups are arranged at two or more different intervals, including the different first and second intervals, in the predetermined direction in the antenna device, the plurality of antenna groups being configured as a linear array antenna.

2. The antenna device according to claim 1, wherein:
each of the antenna groups includes three or more of the unit antennas, and each of the antenna groups has any one of:
a first configuration in which the three or more of the unit antennas are arranged at the two or more different intervals in the predetermined direction; and
a second configuration in which, when an interval between adjacent unit antennas of the respective adjacent antenna groups in the predetermined direction is defined as an adjacent group antenna interval, at least one of the intervals between the unit antennas adjacent to each other in the antenna group is different from the adjacent group antenna interval.

3. The antenna device according to claim 2, wherein:
the plurality of antenna groups includes at least three antenna groups;
each of two of the antenna groups in the at least three antenna groups located at both ends of the at least three antenna groups in the predetermined direction is configured such that feeder terminals of the corresponding unit antennas are connected with each other; and
when at least one antenna group other than the two antenna groups located at both ends of the at least three antenna groups is defined as at least one internal antenna group, the unit antennas of the at least one internal antenna group are entirely arranged at the two or more different intervals in the predetermined direction.

4. The antenna device according to claim 3, wherein:
the unit antennas in the at least one internal antenna group comprise at least three unit antennas; and
the at least three unit antennas are arranged at the two or more different intervals in the predetermined direction.

5. The antenna device according to claim 3, wherein:
the at least one internal antenna group comprises at least two internal antenna groups;
the unit antennas in each of the at least two internal antenna groups comprise at least three unit antennas; and
at least one of intervals of adjacent unit antennas in the at least three unit antennas in each of the at least two internal antenna groups is configured to be different from the adjacent group antenna interval.

6. The antenna device according to claim 1, wherein:
in each of the antenna groups, at least one of the unit antennas of the corresponding antenna group is arranged to be shifted in a direction perpendicular to the predetermined direction relative to the other unit antennas in the corresponding antenna group.

7. A target detecting device, comprising:
a transmitting portion configured to transmit a search wave;
a receiving portion configured to receive a reflected wave signal that is generated based on reflection of the search wave by a target; and
an azimuth detecting section configured to detect an azimuth of the target based on the reflected wave signal received by the receiving portion, wherein:
the receiving portion includes:
a plurality of antenna groups, each of the antenna groups including a plurality of unit antennas arranged in a predetermined direction at equal first intervals in each of the antenna groups, the plurality of antenna groups being arranged in the predetermined direction at equal second intervals, the first intervals being different from the second intervals, the plurality of unit antennas across the plurality of antenna groups being arranged at two or more different intervals, including the different first and second intervals, in the predetermined direction in an antenna device; and
the azimuth detecting section includes:
a first detecting function of generating, for each of the antenna groups, reception information based on a received signal received by each of the unit antennas, and detecting an azimuth of the target based on the reception information for each of the antenna groups; and
a second detecting function of:
using one of the plurality of antenna groups or at least two adjacent antenna groups in the plurality of antenna groups as a target group to generate, individually for each of the unit antennas of the target group, reception information based on the received signal received by the corresponding one of the unit antennas; and
detecting an azimuth of the target based on the reception information for each of the unit antennas of the target group.

8. The target detecting device according to claim 7, wherein:
each of the antenna groups includes three or more of the unit antennas, and each of the antenna groups has any one of:
a first configuration in which the three or more of the unit antennas are arranged at the two or more different intervals in the predetermined direction; and
a second configuration in which, when an interval between adjacent unit antennas of the respective adjacent antenna groups in the predetermined direction is defined as an adjacent group antenna interval, at least one of the intervals between the unit antennas adjacent to each other in the antenna group is different from the adjacent group antenna interval.

9. The target detecting device according to claim 8, wherein:
the plurality of antenna groups is at least three antenna groups;

each of two of the antenna groups in the at least three antenna groups located at both ends of the at least three antenna groups in the predetermined direction is configured such that feeder terminals of the corresponding unit antennas are connected with each other; and when at least one antenna group other than the two antenna groups located at both ends of the at least three antenna groups is defined as at least one internal antenna group, the unit antennas of the at least one internal antenna group are entirely arranged at the two or more different intervals in the predetermined direction.

10. The target detecting device according to claim 9, wherein:

the unit antennas in the at least one internal antenna group comprise at least three unit antennas; and the at least three unit antennas are arranged at the two or more different intervals in the predetermined direction.

11. The target detecting device according to claim 9, wherein:

the at least one internal antenna group comprises at least two internal antenna groups;

the unit antennas in each of the at least two internal antenna groups comprise at least three unit antennas; and at least one of intervals of adjacent unit antennas in the at least three unit antennas in each of the at least two internal antenna groups is configured to be different from the adjacent group antenna interval.

12. The target detecting device according to claim 7, wherein:

in each of the antenna groups, at least one of the unit antennas of the corresponding antenna group is arranged to be shifted in a direction perpendicular to the predetermined direction relative to the other unit antennas in the corresponding antenna group.

* * * * *